United States Patent
Yoda et al.

(10) Patent No.: US 11,117,300 B2
(45) Date of Patent: Sep. 14, 2021

(54) MOLD CLAMPING DEVICE

(71) Applicant: NISSEI PLASTIC INDUSTRIAL CO., LTD., Nagano-ken (JP)

(72) Inventors: Hozumi Yoda, Nagano-ken (JP); Satoshi Hoshino, Nagano-ken (JP); Hiroo Okubo, Nagano-ken (JP); Atsushi Murata, Nagano-ken (JP); Keiichi Tozawa, Nagano-ken (JP)

(73) Assignee: SEIKO INSTRUMENTS INC.

( * ) Notice: Subject to any disclaimer, the term of this patent is extended or adjusted under 35 U.S.C. 154(b) by 0 days.

(21) Appl. No.: 16/826,112

(22) Filed: Mar. 20, 2020

(65) Prior Publication Data

US 2020/0307051 A1 Oct. 1, 2020

(30) Foreign Application Priority Data

Mar. 29, 2019 (JP) ............................. JP2019-066631

(51) Int. Cl.
*B29C 45/67* (2006.01)
*B29C 45/64* (2006.01)
(Continued)

(52) U.S. Cl.
CPC .............. *B29C 45/64* (2013.01); *B29C 33/24* (2013.01); *B29C 45/6707* (2013.01); *B29C 45/6728* (2013.01); *B29C 2045/688* (2013.01)

(58) Field of Classification Search
CPC ............ B29C 45/6707; B29C 45/6728; B29C 2045/688; B29C 33/202; B29C 33/24;
(Continued)

(56) References Cited

U.S. PATENT DOCUMENTS 3,734,673 A * 5/1973 Paterson ................. B22D 17/26
425/451.2
4,038,015 A * 7/1977 Dawson ................... B29C 45/67
425/451.7
(Continued)

FOREIGN PATENT DOCUMENTS

| CN | 105880507 | 8/2016 |
| EP | 387496 | * 9/1990 |
| WO | 2007121134 | 10/2007 |

OTHER PUBLICATIONS

English-language machine translation of Japanese Patent No. 2675425 registered Jul. 18, 1997.
(Continued)

*Primary Examiner* — James P Mackey
(74) *Attorney, Agent, or Firm* — Adams & Wilks

(57) ABSTRACT

A mold clamping device includes a base, a stationary platen fixed to the base and supporting a stationary mold, a movable platen movable on the base and supporting a movable mold, and a mold clamping mechanism for clamping the movable mold against the stationary mold. Tie bars extend from the stationary platen completely through both the movable platen and the mold clamping mechanism. A shaft supporting plate is fixed to the ends of the tie bars and terminates at its lower end portion in two spaced-apart shoes that have flat bottom surfaces in direct sliding contact with the base. The flat bottom surface of each shoe has a larger area than the cross-sectional area of the shaft supporting plate situated vertically above the shoe.

6 Claims, 8 Drawing Sheets

(51) Int. Cl.
*B29C 33/24* (2006.01)
*B29C 45/68* (2006.01)

(58) Field of Classification Search
CPC .......... B29C 45/1761; B29C 2045/664; B22D 17/26
See application file for complete search history.

(56) References Cited

U.S. PATENT DOCUMENTS

| | | | | |
|---|---|---|---|---|
| 4,281,977 | A * | 8/1981 | Farrell | B29C 45/1751 |
| | | | | 264/40.5 |
| 4,337,022 | A * | 6/1982 | Laurent | B29C 45/1761 |
| | | | | 425/192 R |
| 4,530,655 | A * | 7/1985 | Hehl | B29C 45/1761 |
| | | | | 425/451 |
| 5,059,365 | A * | 10/1991 | Hertzer | B29C 45/7653 |
| | | | | 264/40.5 |
| 5,275,550 | A * | 1/1994 | Romi | B29C 45/6707 |
| | | | | 425/450.1 |
| 6,027,329 | A * | 2/2000 | Nazarian | B29C 45/1744 |
| | | | | 264/219 |
| 10,300,529 | B2 * | 5/2019 | Murata | B22D 17/26 |
| 2003/0217829 | A1 * | 11/2003 | Baron | B29C 45/6707 |
| | | | | 164/137 |
| 2006/0263471 | A1 * | 11/2006 | Tsuji | B29C 45/68 |
| | | | | 425/595 |
| 2007/0237851 | A1 * | 10/2007 | Baron | B29C 45/6728 |
| | | | | 425/451.9 |
| 2016/0121530 | A1 * | 5/2016 | Yoda | B29C 45/1761 |
| | | | | 425/589 |
| 2019/0299510 | A1 * | 10/2019 | Jinno | B29C 45/80 |

OTHER PUBLICATIONS

English-language machine translation of Publication No. JP05-200816, publication date Aug. 10, 1993.
English-language machine translation of Notice of Reasons for Refusal dated Feb. 9, 2021 in Japanese Patent Application No. 2019-066631.
English-language machine translation of Pub. No. JP04-224910, publication date Aug. 14, 1992.
English-language machine translation of Pub. No. JP08-336870, publication date Dec. 24, 1996.
English-language machine translation of Pub. No. JP2017-100301, publication date Jun. 8, 2017.

* cited by examiner

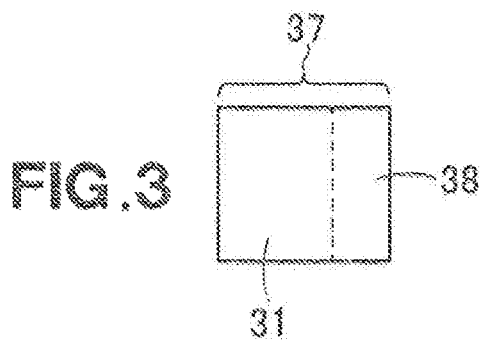

MOLD CLAMPING DEVICE

FIELD OF THE INVENTION

The present disclosure relates to a mold clamping device that clamps metal molds.

BACKGROUND

An injection molding apparatus includes, as primary components, an injection device and a mold clamping device. The injection device injects a resin material into metal molds. At this time, it is necessary to keep closing the metal molds against injection pressure. Accordingly, the mold clamping device keeps clamping the metal molds.

An example known mold clamping device is disclosed in, for example, Japan Patent No. 2675425.

The technology disclosed in Japan Patent No. 2675425 will be described with reference to FIG. 8.

As illustrated in FIG. 8, a mold clamping device 100 includes a base 101, a stationary platen 102 fixed to the base 101, a movable platen 103 placed on the base 101 so as to correspond to the stationary platen 102, a mold clamping cylinder 104 that pushes out the movable platen 103 toward the stationary platen 102, tie bars 105 which are extended from the stationary platen 102 and which pass completely through the movable platen 103 and through the mold clamping cylinder 104, and a shaft supporting plate 106 which is fixed to the base 101 and which supports the tips of the respective tie bars 105. The stationary platen 102 supports a stationary mold 107. The movable platen 103 supports a movable mold 108. The mold clamping cylinder 104 includes half nuts 109. A fast-forward cylinder 111 is connected to the movable platen 103 and to the shaft supporting plate 106.

The half nut 109 is disengaged (unlocked). A piston rod 104a of the mold clamping cylinder 104 is caused to be freely movable in the axial direction. In addition, the movable platen 103 is fast-forwarded toward the stationary platen 102 by the fast-forward cylinder 111. In this case, the movable mold 108 abuts the stationary mold 107.

Next, the half nut 109 is engaged with the corresponding tie bar 105. After the engagement, the mold clamping cylinder 104 is fixed to the tie bar 105. Subsequently, the piston rod 104a of the mold clamping cylinder 104 is moved forward. Consequently, the movable mold 108 is subjected to mold clamping with the stationary mold 107 by intensive force.

At the time of this mold clamping, the tie bars 105 are slightly elongated between the stationary platen 102 and the half nut 109. That is, when a distance between the stationary platen 102 and the half nut 109 is L1, this L1 changes to L1+α (where α is an elongated amount and is a positive value).

In contrast, the tie bar 105 is slightly compressed between the half nut 109 and the shaft supporting plate 106. That is, when a distance between the half nut 109 and the shaft supporting plate 106 is L2, this L2 changes to L2-α.

When the tie bar 105 is elongated, although the outer diameter thereof decreases, the linearity is maintained.

In contrast, when the tie bar 105 is compressed, it is curved like a line A, and thus the linearity is no longer maintained. When the tie bar 105 is curved, the shaft supporting plate 106 is curved like a line B.

The shaft supporting plate 106 has a primary role to support the tip of the tie bar 105. The shaft supporting plate 106 is also a basal point for the fast-forward cylinder 111. Hence, curving of the shaft supporting plate 106 is not preferable.

In order to address this technical problem, the shaft supporting plate 106 may be thickened (in a horizontal direction in the figure) to enhance the rigidity of the shaft supporting plate 106.

When the thickness increases, the weight of the shaft supporting plate 106 increases, resulting in an increase in weight of the mold clamping device 100.

In view of a request for weight saving of the mold clamping device, it is not preferable to increase the thickness of the shaft supporting plate.

SUMMARY OF THE INVENTION

An objective of the present disclosure is to provide a mold clamping device capable of avoiding an increase in weight while preventing a tie bar from being bent.

According to a first embodiment of the present disclosure, a mold clamping device includes:

a base;

a stationary platen fixed to the base and supporting a stationary mold;

a movable platen supporting a movable mold that corresponds to the stationary mold;

a mold clamping mechanism that clamps the movable mold against the stationary mold;

a tie bar extended from the stationary platen and passing completely through the movable platen and through the mold clamping mechanism; and a half nut mechanically connecting the mold clamping mechanism to the tie bar.

The mold clamping device further includes a shaft supporting plate supporting a tip of the tie bar, and the shaft supporting plate is fixed to the tip of the tie bar, and is mounted on the base so as to be freely movable.

According to the present disclosure, the shaft supporting plate is fixed to the tip of the tie bar, and is mounted on the base so as to be freely movable. When compression force is applied between the shaft supporting plate and the molding clamping mechanism, the shaft supporting plate moves on the base. This movement addresses the compression force. Consequently, the tie bar is not curved. Since the tie bar is not curved, the shaft supporting plate is not curved. Since not curved, the rigidity of the shaft supporting plate can be reduced, enabling thinning and weight saving.

According to the present disclosure, the mold clamping device capable of avoiding an increase in weight while preventing a tie bar from being bent, is provided.

According to a second embodiment of the present disclosure, a mold clamping device includes:

a base;

a stationary platen fixed to the base and supporting a stationary mold;

a movable platen supporting a movable mold that corresponds to the stationary mold:

a mold clamping mechanism that clamps the movable mold against the stationary mold;

a tie bar extended from the stationary platen and passing completely through the movable platen and through the mold clamping mechanism; and a half nut mechanically connecting the mold clamping mechanism to the tie bar.

The mold clamping device further includes a shaft supporting plate supporting a tip of the tie bar.

The shaft supporting plate is fixed to the base and is provided with a through-hole through which the tip of the tie bar passes.

The tie bar is supported by the shaft supporting plate so as to be freely movable.

According to the present disclosure, the shaft supporting plate is fixed to the base, and is provided with the through-hole through which the tip of the tie bar passes. The tie bar is fitted in the through-hole so as to be freely movable. When compression force is applied between the shaft supporting plate and the mold clamping mechanism, the tie bar moves relative to the shaft supporting plate. This movement addresses the compression force. Consequently, the tie bar is not curved. Since the tie bar is not curved, the shaft supporting plate is not curved. Since not curved, the rigidity of the shaft supporting plate can be reduced, enabling thinning and weight saving.

According to the present disclosure, the mold clamping device capable of avoiding an increase in weight while preventing a tie bar from being bent, is provided.

Preferably, the shaft supporting plate may include:

a pair of columns extending upwardly from the base;

an upper cross member extending horizontally and connecting the respective upper portions of the columns to each other; and a lower cross member extending horizontally and connecting respective middle portions of the columns in a height direction.

Since the shaft supporting plate is a rectangular frame, the shaft supporting plate can be made further lightweight.

Preferably, a shoe that has a larger bottom area than a cross-sectional area of the column as viewed from a bottom may be provided at a lower end of the column.

Since the shoe is provided at the lower end of the column, the shaft supporting plate can stand upright stably.

BRIEF DESCRIPTION OF THE DRAWINGS

Several preferable embodiments of the present disclosure will be described below in detail with reference to the accompanying figures in which:

FIG. 3 is a diagram as viewed along an arrow 3 in FIG. 1;

DETAILED DESCRIPTION OF THE EMBODIMENTS

First Embodiment

A mold clamping device according to a first embodiment will be described with reference to FIG. 1 to FIG. 6.

Figure 1:
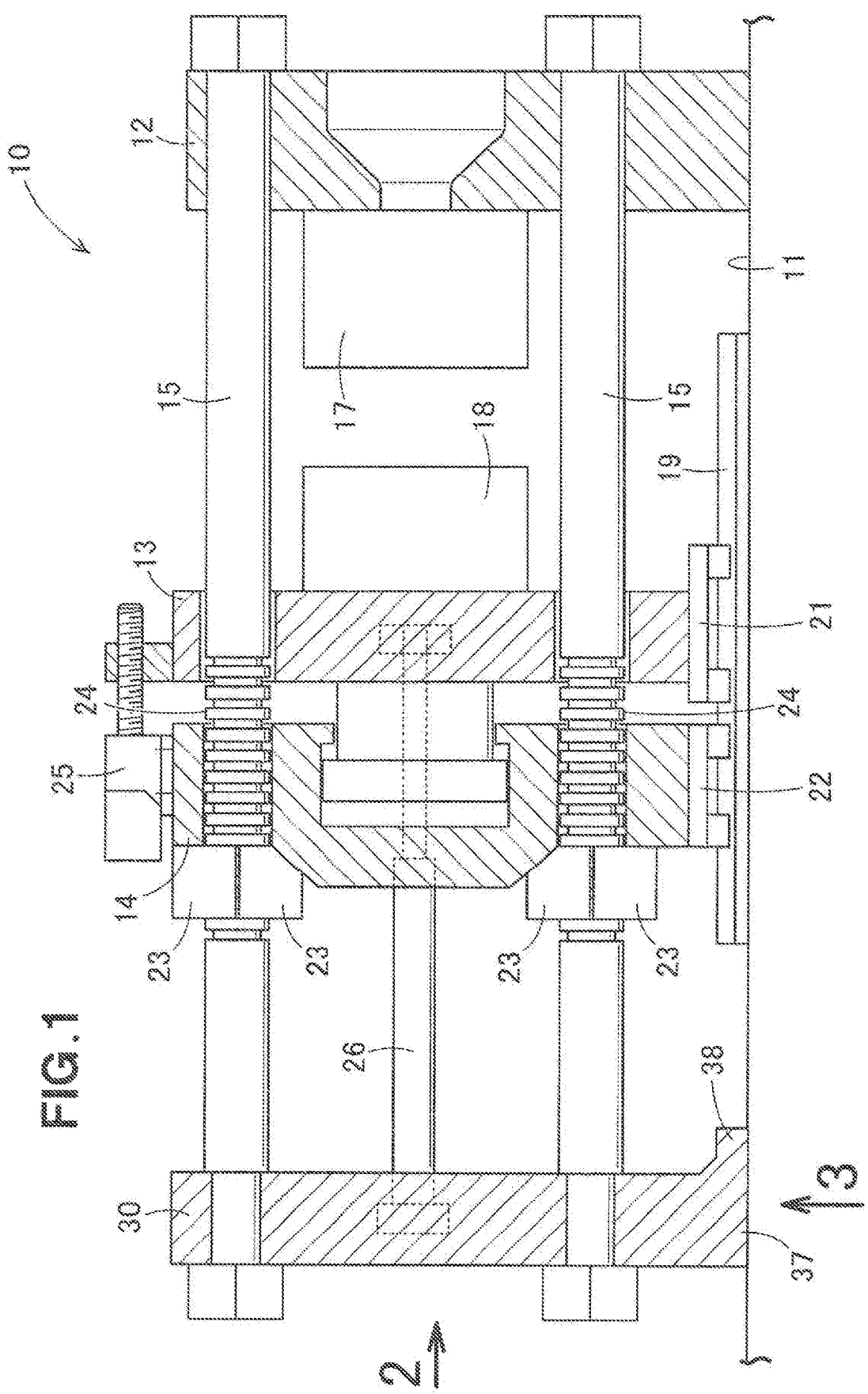
FIG. 1 is a side view of a mold clamping device according to the present disclosure.

As illustrated in FIG. 1, a mold clamping device 10 includes a base 11, a stationary platen 12, a movable platen 13, a mold clamping mechanism 14, tie bars 15, and a shaft supporting plate 30.

The stationary platen 12 is fixed to the base 11.

The movable platen 13 is placed on the base 11 so as to be freely movable.

The mold clamping mechanism 14 has a role of pushing out the movable platen 13 toward the stationary platen 12.

The tie bars 15 are each extended from the stationary platen 12, and pass completely through the movable platen 13 and through the mold clamping mechanism 14.

The shaft supporting plate 30 is placed on the base 11, and supports tips of the respective tie bars 15.

The stationary platen 12 supports a stationary mold 17. The movable platen 13 supports a movable mold 18.

Preferably, a rail 19 is placed and laid over on the base 11. Moreover, a first slider 21 and a second slider 22 are placed on this rail 19 so as to be freely movable. The first slider 21 supports movable the platen 13, and the second slider 22 supports the mold clamping mechanism 14. Note that there is no problem if either one or both of the movable platen 13 and the mold clamping mechanism 14 are directly placed on the base 11.

Moreover, the shaft supporting plate 30 may be directly placed on the base 11, or may be indirectly placed on the base 11 indirectly via the rail or the slider.

The mold clamping mechanism 14 includes half nuts 23.

The tie bars 15 each include a threaded or sawtooth portion 24 corresponding to each half nut 23.

Preferably, a position adjusting actuator 25 is connected to the mold clamping mechanism 14 and to the movable platen 13.

Moreover, fast-forward mechanisms 26 are connected to the movable platen 13 and to the shaft supporting plate 30.

Note that although a hydraulic cylinder is suitable for the mold clamping mechanism 14, an electric motor cylinder that has a built-in ball screw or a toggle mechanism may be adopted.

Furthermore, although an electric motor cylinder that has a built-in ball screw is suitable for the position adjusting actuator 25, a hydraulic cylinder or a pneumatic cylinder may be adopted.

Still further, although a hydraulic cylinder is suitable for each fast-forward mechanism 26, an electric motor cylinder that has a built-in ball screw may be adopted.

Figure 2:
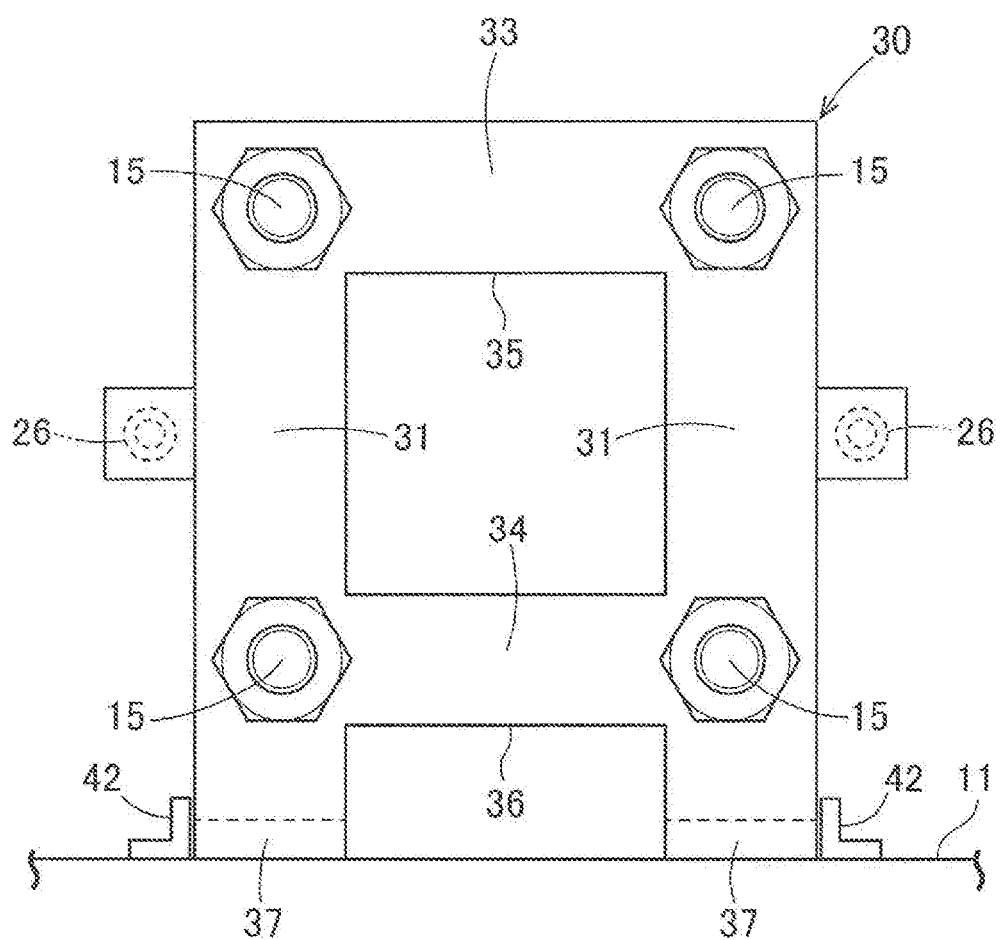
FIG. 2 is a diagram as viewed along an arrow 2 in FIG. 1.

As illustrated in FIG. 2, the shaft supporting plate 30 includes a pair of right and left columns 31 that extends upwardly from the base 11, an upper cross member 33, and a lower cross member 34.

The upper cross member 33 is extended horizontally, and connects the upper portions of the respective columns 31.

The lower cross member 34 is extended horizontally, and connects the intermediate portions of the respective columns 31 in a height direction.

The shaft supporting plate 30 is provided with a rectangular opening 35 between the upper cross member 33 and the lower cross member 34, and is provided with a horizontally-long opening 36 between the lower cross member 34 and the base 11.

In comparison with a simple wall shape, the shaft supporting plate 30 can be a solid body except the rectangular opening 35 and the horizontally-long opening 36, thus can be lightweight by what corresponds to such openings. However, there is no technical problem if the shaft supporting plate 30 is formed in a simple wall shape.

The shaft supporting plate 30 moves from the front side of FIG. 2 to the depth side thereof. In order to guide the moving shaft supporting plate 30, a side guide 42 may be provided on the base 11. However, since the moving distance is quite short, the side guide 42 may be omitted.

As illustrated in FIGS. 1-3, the shaft supporting plate 30 terminates at its lower end portion in two spaced-apart shoes 37. Each shoe 37 has a flat bottom surface in direct sliding contact with the base 11, and the flat bottom surface of each shoe has a larger area than the cross-sectional area of the shaft supporting plate 30 situated vertically above the shoe 37. In this embodiment, each column 31 of the shaft supporting plate 30 includes, as viewed from a the bottom (underside), a shoe 37 that has a larger bottom area than a cross-sectional area of the column 31. That is, each column 31 includes a projecting portion 38 that projects toward the stationary platen 12 illustrated in FIG. 1. In FIG. 1, when a horizontal external force is applied to the shaft supporting plate 30, since the shaft supporting plate 30 is provided with the projecting portions 38, such a plate is not likely to fall down.

Figure 4A:
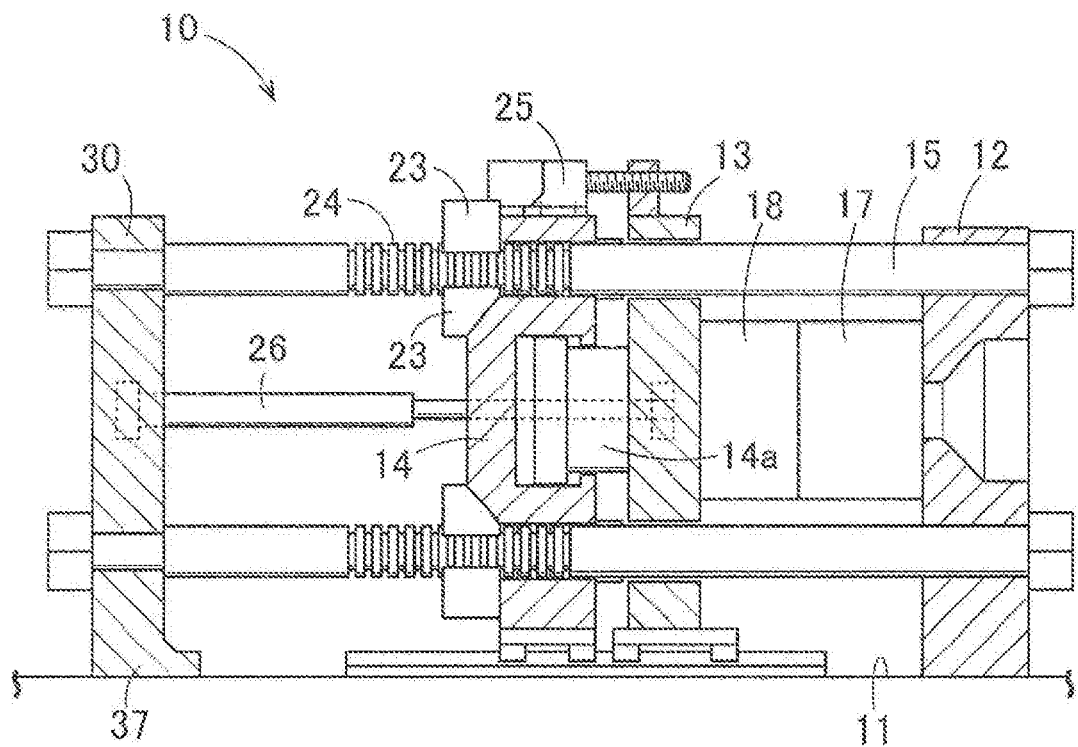
FIG. 4A is a diagram illustrating the mold clamping device when a half nut is in an unlocked condition.
Figure 4B:
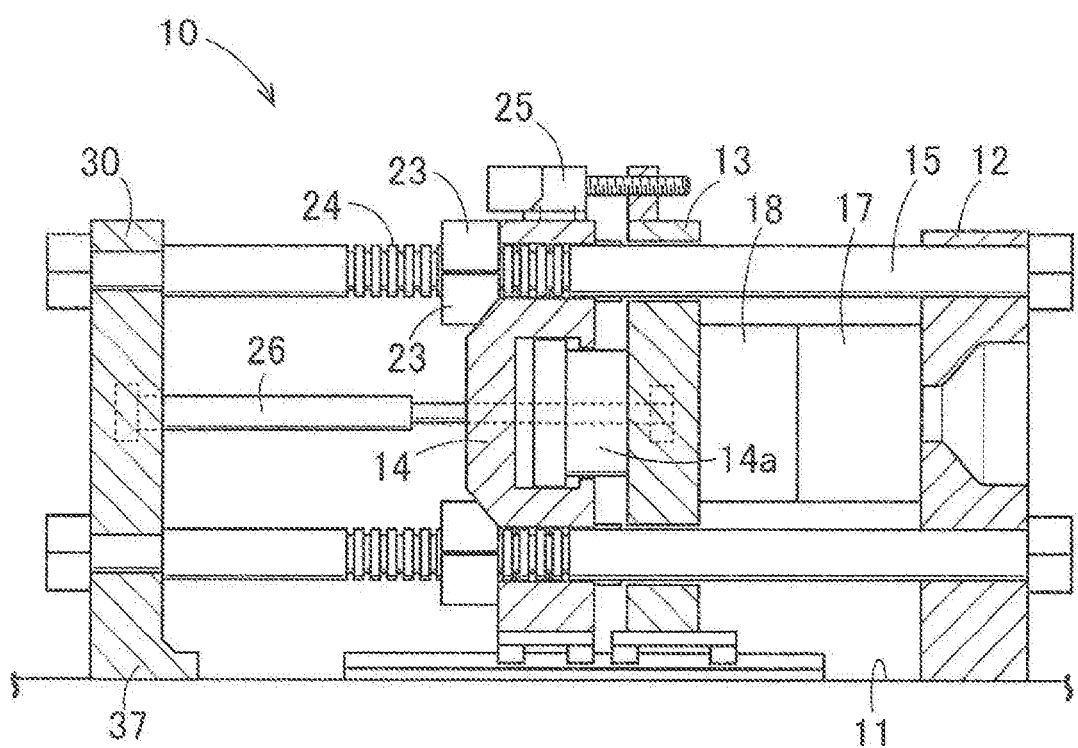
FIG. 4B is a diagram illustrating the mold clamping device when the half nut is in a locked condition.

With reference to FIG. 4A and FIG. 4B, an action of the mold clamping device 10 that employs the above-described structure will be described.

As illustrated in FIG. 4A, the half nuts 23 are changed to a release (unlocked) condition. This causes the mold clamping mechanism 14 and the movable platen 13 to be freely movable in the axial direction. In addition, the movable platen 13 is fast-forwarded toward the stationary platen 12 by the fast-forward mechanisms 28, and causes the movable mold 18 to abut the stationary mold 17.

Next, the mold clamping mechanism 14 is moved horizontally by the position adjusting actuator 25 with reference to the movable platen 13 until the male threads of the respective half nuts 23 are meshed with the female threads of the respective sawtooth portions 24.

When the movement is completed, as illustrated in FIG. 4B, the respective half nuts 23 are engaged with the respective sawtooth portions 24. The mold clamping mechanism 14 is mechanically coupled to the tie bars 15, and is fixed thereto.

Next, the piston rod 14a is moved forward by the mold clamping mechanism 14. Consequently, the movable mold 18 is subjected to mold clamping with the stationary mold 17.

At the time of this mold clamping, the tie bars 15 are slightly elongated between the stationary platen 12 and the respective half nuts 23. Simultaneously, the tie bars 15 are about to be slightly compressed between the respective half nuts 23 and the shaft supporting plate 30.

However, according to the present disclosure, since the shaft supporting plate 30 moves on the base 11, no compression phenomenon occurs. Since not compressed, the tie bars 15 are not curved, and the shaft supporting plate 30 is also not curved.

Another shape of the shoe 37 will be described with reference to FIG. 5A to FIG. 5D.

Figure 5A:
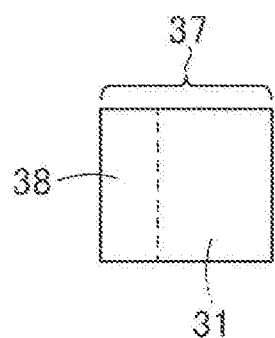
FIG. 5A, FIG. 5B, FIG. 5C, and FIG. 5D are diagrams for describing various forms of a shoe.

As illustrated in FIG. 5A, the projecting portion 88 may be extended to an opposite side to the stationary platen (reference numeral 12, in FIG. 1).

Figure 5B:
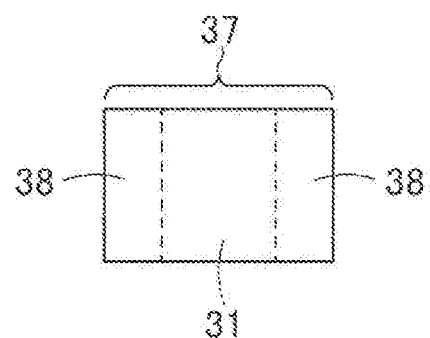

As illustrated in FIG. 5B, the projecting portion 38 may be extended toward both the stationary platen and a side opposite to the stationary platen.

Figure 5C:
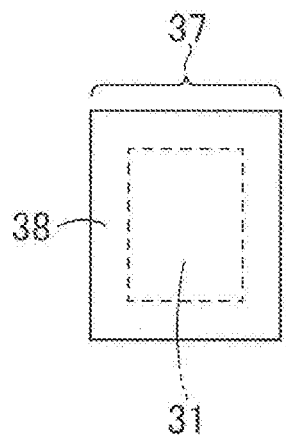

As illustrated in FIG. 5C, the projecting portion 38 may be provided so as to surround the entire circumference of the column 31.

That is, as illustrated in FIGS. 5A to 5C, since the shoe 37 that has a larger bottom area than the cross-sectional area of the column 31 is provided at the lower end of the column 31, the column 31 can stand upright from the base stably.

Figure 5D:
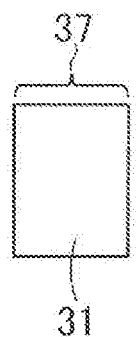

Note that as illustrated in FIG. 5D, a shape that has no projecting portion 38 may be adopted.

Meanwhile, in FIG. 2, the fast-forward cylinders 26 are placed at middle (including substantially middle) positions between the upper and lower tie bars 15. Although this is a quite rare case, when the movable platen (reference numeral 13 in FIG. 1) is fast-forwarded, the movable platen does not move smoothly.

An example structure that addresses such a problem will be described with reference to FIG. 6.

Figure 6:
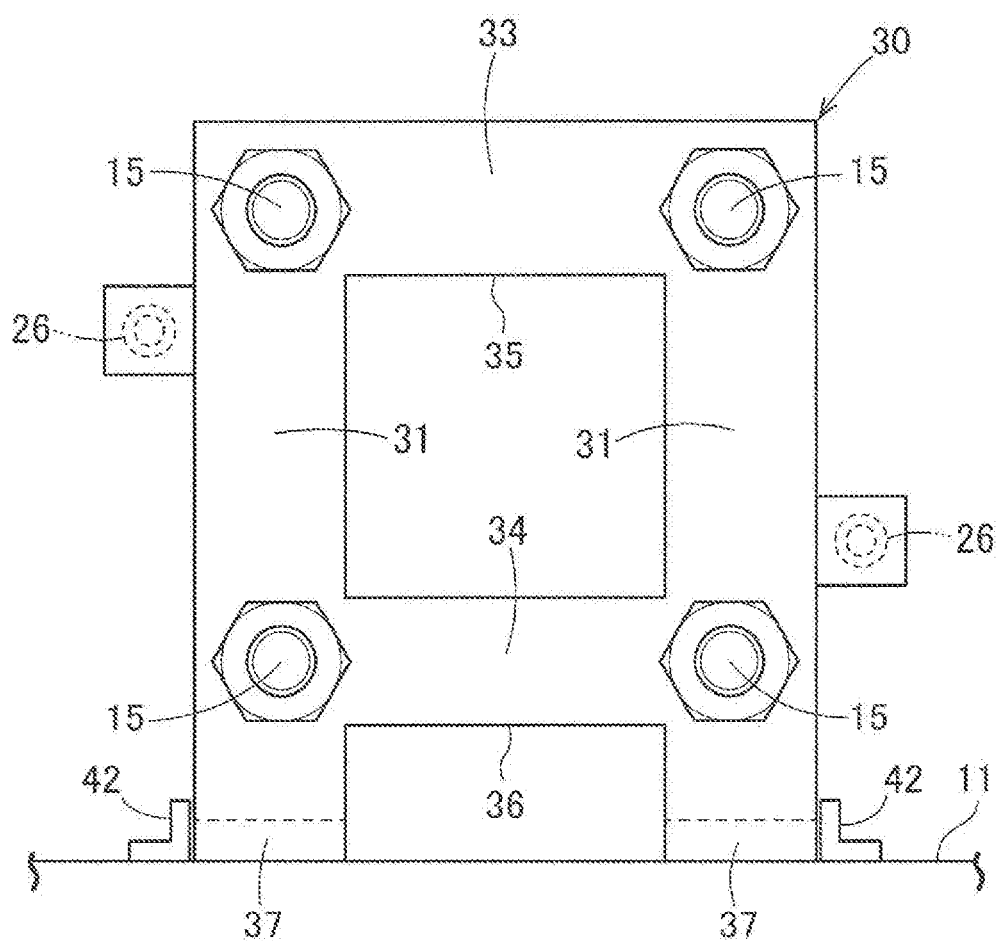
FIG. 6 is a diagram for describing an example in which an attached position of a fast-forward cylinder is changed.

As illustrated in FIG. 6, one of the pair of fast-forward mechanisms (cylinders) 26 may be placed above the middle position between the upper and lower tie bars 15, and the other may be placed below the middle position between the upper and lower tie bars 15. That is, the pair of fast-forward cylinders 26 is placed at diagonal positions. The one fast-forward cylinder 26 becomes distant from the base 11, while the other fast-forward cylinder 26 becomes close to the base 11. Since both the distances differ, the movement of the movable platen becomes smooth.

Second Embodiment

A mold clamping device according to a second embodiment will be described with reference to FIG. 7. Note that the common component as that in FIG. 1 will be denoted by the same reference numeral in FIG. 1.

Figure 7:
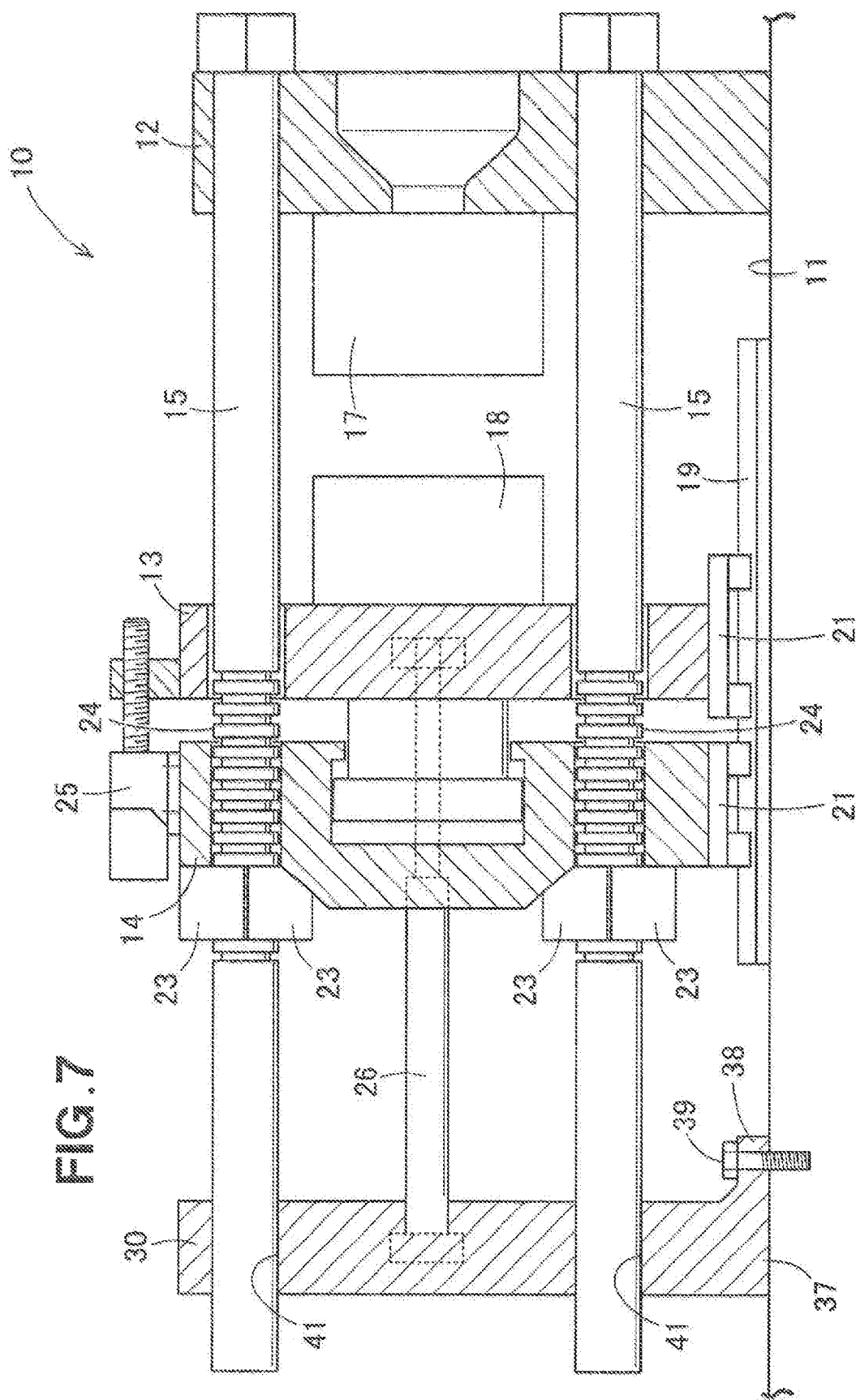
FIG. 7 is a side view of a mold clamping device according to a modified example of the present disclosure.
Figure 8:
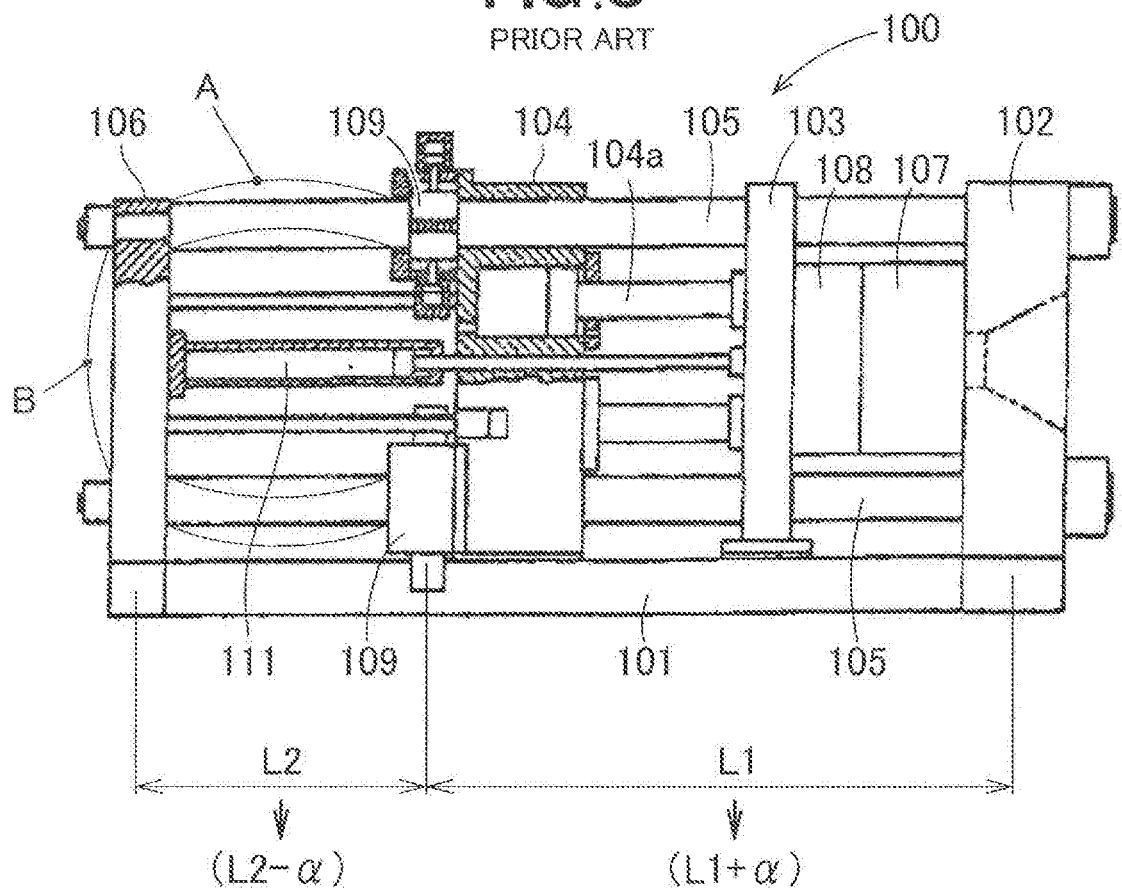
FIG. 8 is a diagram for describing a basic structure of a conventional technology.

The mold clamping device 10 illustrated in FIG. 7 differs from the mold clamping device 10 illustrated in FIG. 1 such that the shaft supporting plate 30 is fixed to the base 11 by bolts 39, etc., and the tie bars 15 pass completely through the shaft supporting plate 30.

That is, the shaft supporting plate 30 includes through-holes 41 through which the tips of the respective tie bars 15 pass completely. The tips of the respective tie bars 15 are fitted in the respective through-holes 41. The tie bars 15 are supported by the shaft supporting plate 30 so as to be freely movable.

At the time of mold clamping, the tie bars 15 are slightly elongated between the stationary platen 12 and the respective half nuts 23. Simultaneously, the tie bars 15 are about to be slightly compressed between the half nuts 23 and the shaft supporting plate 30.

However, according to the present disclosure, since the tie bars 15 move in the shaft supporting plate 30, no compression phenomenon occurs. Since not compressed, the tie bar 15 are not curved, and the shaft supporting plate 30 are not curved.

As described with reference to FIG. 1 and FIG. 7, according to the present disclosure, the shaft supporting plate 30 does not disrupt the movement of the tie bars 15 in the axial direction. Hence, no horizontal external force is applied to the shaft supporting plate 30. The shaft supporting plate 30 accomplishes only a role of supporting the tips of the tie bars 15. Since it is adequate for the shaft supporting plate 30 to merely accomplish a role of supporting a part of the weight of each tie bar 15, a large rigidity is unnecessary. Consequently, the shaft supporting plate 30 which has a low rigidity, thin, and lightweight can be adopted.

The present disclosure is suitable for a mold clamping device that includes a shaft supporting plate.

What is claimed is:

1. A mold clamping device comprising:
a base;
a stationary platen fixed to the base and supporting a stationary mold;
a movable platen supporting a movable mold that corresponds to the stationary mold;
a mold clamping mechanism that clamps the movable mold against the stationary mold;
a tie bar extended from the stationary platen and passing completely through the movable platen and through the mold clamping mechanism;
a half nut mechanically connecting the mold clamping mechanism to the tie bar; and
a shaft supporting plate fixed to an end portion of the tie bar that extends completely through an opening in the shaft supporting plate for supporting the tie bar, the shaft supporting plate terminating at its lower end portion in two spaced-apart columns, each column terminating at its lower end in a shoe, each shoe having a larger bottom area than the cross-sectional area of its respective column, and the shoes being mounted on the base to undergo free sliding movement thereon in the axial direction of the tie bar.

2. The mold clamping device according to claim 1,
wherein the two columns extend upward to an upper end of the shaft supporting plate; and
wherein the shaft supporting plate further comprises:
an upper cross member extending horizontally and connecting respective upper portions of the columns to each other; and
a lower cross member extending horizontally and connecting respective middle portions of the columns in a height direction.

3. The mold clamping device according to claim 2, wherein each shoe includes a projecting portion that projects from its respective column toward the stationary platen.

4. The mold clamping device according to claim 3, wherein the projecting portion of each shoe projects from and surrounds the entire circumference of its respective column.

5. The mold clamping device according to claim 1, wherein each shoe includes a projecting portion that projects from its respective column toward the stationary platen.

6. The mold clamping device according to claim 5, wherein each shoe includes another projecting portion that projects from an opposite side of the column than the first-mentioned projecting portion.

* * * * *

UNITED STATES PATENT AND TRADEMARK OFFICE
CERTIFICATE OF CORRECTION

PATENT NO. : 11,117,300 B2
APPLICATION NO. : 16/826112
DATED : September 14, 2021
INVENTOR(S) : Yoda et al.

It is certified that error appears in the above-identified patent and that said Letters Patent is hereby corrected as shown below:

On the Title Page

Item (73):
"SEIKO INSTRUMENTS INC."
Should be changed to:
--NISSEI PLASTIC INDUSTRIAL CO., LTD.--

Signed and Sealed this
Seventh Day of June, 2022

Katherine Kelly Vidal
*Director of the United States Patent and Trademark Office*